US009361250B2

(12) United States Patent
Shan et al.

(10) Patent No.: US 9,361,250 B2
(45) Date of Patent: Jun. 7, 2016

(54) MEMORY MODULE AND METHOD FOR EXCHANGING DATA IN MEMORY MODULE

(75) Inventors: Gang Shan, Shanghai (CN); Howard Yang, Shanghai (CN)

(73) Assignee: MONTAGE TECHNOLOGY (SHANGHAI) CO., LTD., Yishan Road, Shanghai (CN)

(*) Notice: Subject to any disclaimer, the term of this patent is extended or adjusted under 35 U.S.C. 154(b) by 586 days.

(21) Appl. No.: 12/903,223

(22) Filed: Oct. 13, 2010

(65) Prior Publication Data

US 2011/0161569 A1 Jun. 30, 2011

(30) Foreign Application Priority Data

Dec. 25, 2009 (CN) .......................... 2009 1 0200826

(51) Int. Cl.
*G06F 13/42* (2006.01)
*G06F 13/16* (2006.01)
*G06F 13/40* (2006.01)

(52) U.S. Cl.
CPC ........ *G06F 13/1694* (2013.01); *G06F 13/4009* (2013.01); *G06F 2212/205* (2013.01); *Y02B 60/1228* (2013.01)

(58) Field of Classification Search
CPC .......... G06F 2213/3852; G06F 13/387; G06F 2212/6022; G06F 3/0655–3/0661; G06F 13/40–13/4059; G06F 3/0646–3/0652; G06F 3/068; G06F 3/0685; G06F 2212/205; G06F 2212/217; G06F 2212/225
USPC .......................... 711/103, 154, 165, 170, 203
See application file for complete search history.

(56) References Cited

U.S. PATENT DOCUMENTS

| 7,243,185 | B2* | 7/2007 | See et al. ........................ 711/103 |
| 2007/0038808 | A1* | 2/2007 | Yim et al. ....................... 711/120 |
| 2007/0136523 | A1* | 6/2007 | Bonella et al. ................. 711/113 |
| 2007/0274040 | A1* | 11/2007 | Chen ............................... 361/695 |
| 2007/0288683 | A1* | 12/2007 | Panabaker et al. ............ 711/101 |
| 2008/0109593 | A1* | 5/2008 | Karamcheti et al. .......... 711/103 |
| 2008/0126588 | A1* | 5/2008 | Chong ............................ 710/13 |
| 2009/0031099 | A1* | 1/2009 | Sartore .......................... 711/162 |
| 2009/0049334 | A1* | 2/2009 | Elliott et al. ...................... 714/5 |
| 2010/0110748 | A1* | 5/2010 | Best ................................ 365/51 |

* cited by examiner

*Primary Examiner* — Adam M Queler
*Assistant Examiner* — Nicholas Simonetti
(74) *Attorney, Agent, or Firm* — Jun He Law Offices P.C.; James J. Zhu

(57) ABSTRACT

The present application provides a memory module. The memory module includes one or more volatile memory devices, one or more non-volatile memory devices, and a data exchange controller. The data exchange controller controls data exchange between the volatile memory devices and the non-volatile memory devices.

14 Claims, 6 Drawing Sheets

MEMORY MODULE AND METHOD FOR EXCHANGING DATA IN MEMORY MODULE

PRIORITY CLAIM

This application claims the benefit of Chinese patent application number 200910200826.1, filed Dec. 25, 2009, which is incorporated herein by reference in its entirety.

BACKGROUND

Memory devices generally include volatile memory devices and non-volatile memory devices. Volatile memory devices generally include DRAM (dynamic random access memory) devices and SRAM (static random access memory) devices. Usually, volatile memory devices have the advantage of high access speed and the drawback of high power consumption because power supply must not be shut down to prevent loss of the data stored therein. Non-volatile memory devices have higher storage density per unit volume compared with volatile memory devices and lower power consumption because the data stored therein will not be lost even after power supply is shut down. The access speed of non-volatile memory devices is lower than most volatile memory devices but higher than most mechanical hard drives.

Most memory devices used in computer memory systems are volatile memory devices such as DRAM devices. Non-volatile memory devices are usually used in external storage devices, such as solid state disks and USB disks, accessed through I/O interfaces.

SUMMARY

In one aspect, data will be transformed in format several times to perform data exchange between a memory system and a device through I/O interface. For example, the data can be transformed between the format of the device, the format of the I/O interface, the format of the memory system, etc. These transforms complicate the data exchange and consumes system resources such as CPU resources and memory controller resources.

In another aspect, a memory system can be shared by many devices. If the computing system instructs a device, such as a hard disk, connected to the computing system through I/O interface to access the memory system, the device must compete with other devices instructed to access the memory system. In many cases, devices connected to the computing system through I/O interface have lower priority in the competition, and this can decrease efficiency.

In another aspect, data exchange with a memory system through I/O interface is controlled by CPU, and such data exchanges consume CPU resources.

In another aspect, data exchange with a memory system through I/O interface is controlled by and through a memory controller, and such data exchanges consume memory controller resources.

In another aspect, when a computing system is switched from running state to sleeping state, there is still data stored in memory system. To prevent loss of the data, in some cases, the computing system continues to supply power to the memory system, and this consumes power. In other cases, when the computing system is switched from running state to sleeping state, at least part of the data will be moved to hard disk, and then the computing system shuts down the power supply to some or all of memory devices of the memory system. As mentioned above, the process of data exchange with memory system through I/O interface is complex and can take a long period of time. As a result it costs a relative long period of time to recover the computing system from sleeping state.

The inventors of the present application realize that because of the bottleneck of the speed of I/O interface and the complicated process of data exchange with memory system through I/O interface, the speed of non-volatile memory devices such as FLASH devices is not fully utilized.

In one aspect of the present application, a memory module is provided. The memory module includes one or more volatile memory devices, one or more non-volatile memory devices, and a data exchange controller. The data exchange controller controls data exchange between the volatile memory devices and the non-volatile memory devices.

In some embodiments, when the data exchange controller receives a first instruction, it controls reading data from the non-volatile memory devices and writing the data into the volatile memory devices, and when the data exchange controller receives a second instruction, it controls reading data from the volatile memory devices and writing the data into the non-volatile memory devices.

In some embodiments, the memory module is for buffering data exchange between CPU and other devices.

In some embodiments, the memory module is for storing data and/or computer programs in use.

In some embodiments, the memory module is controlled by a memory controller connected to the memory module and a processor of the computing system directly.

Volatile memory devices include but not limited to DRAM devices and SRAM devices. Non-volatile memory devices include but not limited to FLASH memory devices such as NOR type and NAND type FLASH memory devices, FRAM (ferroelectric random access memory) devices, PCRAM (phase change random access memory) devices.

In some embodiments, a memory module is an assembly of memory devices mounted on a printed circuit board.

In some embodiments, a computer system may include multiple CPUs.

The memory module includes a data interface through which the memory module exchanges data with other devices such as a memory controller. In some embodiments, the data interface is DDR (double data rate) interface. In some embodiments, the data interface is RAMBUS memory module interface.

In some embodiments, data exchange between the volatile memory devices and the non-volatile memory devices can be one-way such as that only from non-volatile memory devices to volatile memory devices, or only from volatile memory devices to non-volatile memory devices. In some embodiments, data exchange between the volatile memory devices and the non-volatile memory devices can be two-way. Data exchange between the volatile memory devices and the non-volatile memory devices is performed internally within the memory module and the exchanged data does not go through a memory controller for controlling data exchange between the memory module and other devices.

In some embodiments, the memory module includes non-volatile memory device controllers for controlling corresponding non-volatile memory devices.

In some embodiments, the memory module includes a volatile memory device controller for controlling the volatile memory devices.

In some embodiments, the memory module includes a bad block managing device for managing bad blocks in the non-volatile memory devices.

In some embodiments, the memory module includes a wear leveling device for managing access times of blocks of the non-volatile memory devices to prevent some blocks from being used much more frequently than other blocks and wearing out too fast.

In some embodiments, the memory module includes a pre-fetch buffer for buffering data read from the non-volatile memory devices. In some embodiments, the non-volatile memory devices are connected to the pre-fetch buffer in parallel to enhance the speed of reading data from the non-volatile memory devices.

In some embodiments, the memory module includes a command distributing device for distributing commands received by the memory module to corresponding devices. In some embodiments, when the command distributing device receives a command of writing data received by the memory module from other devices into the volatile memory devices, the command distributing device directs the received write command to the volatile memory devices. When the command distributing device receives a command of reading data from the volatile memory devices to the data interface, the command distributing device directs the received read command to the volatile memory devices. When the command distributing device receives a command of reading data from the non-volatile memory devices and writing the data into the volatile memory devices, the command distributing device directs the command to the data exchange controller. When the data exchange controller receives the command, it generates a read command and sends it to the non-volatile memory devices, and generates a write command and sends it to the volatile memory devices. When the command distributing device receives a command of reading data from the volatile memory devices and writing the data into the non-volatile memory devices, the command distributing device directs the command to the data exchange controller. When the data exchange controller receives the command, it generates a read command and sends it to the volatile memory devices, and generates a write command and sends it to the non-volatile memory devices.

In another aspect of the present application, a memory system for buffering data exchange between CPU and other devices of a computing system is provided. The memory system includes one or more memory modules and a memory controller. Sometimes, memory controller is also called host, and is for controlling data exchange between the memory modules and other devices. The memory module includes one or more volatile memory devices, one or more non-volatile memory devices, and a data exchange controller. The data exchange controller controls data exchange between the volatile memory devices and the non-volatile memory devices within the memory module according to received instructions, and the data exchange does not go through the memory controller.

In some embodiments, the memory controller can be an independently packaged device. In some embodiments, the memory controller can be integrated in CPU.

In another aspect of the present application, a memory module for buffering data exchange between processor(s) and other devices of a computing system is provided. The memory module includes one or more volatile memory devices, one or more non-volatile memory devices, and a data exchange controller. The data exchange controller controls data exchange between the volatile memory devices and the non-volatile memory devices within the memory module according to received instructions.

In another aspect of the present application, a memory module of a computing system is provided. The memory module includes one or more volatile memory devices for running computer programs, and one or more non-volatile memory devices for storing the computer programs when the computing system is powered off or in sleeping state.

In another aspect of the present application, a memory module of a computing system is provided. The memory module includes one or more volatile memory devices and one or more non-volatile memory devices for storing at least part of data stored in the volatile memory devices when the computing system is switched from running state to sleeping state.

In some embodiments, the memory module is DIMM (dual in line memory module).

In some embodiments, the memory module is DDR DIMM.

In some embodiments, the volume of the non-volatile memory device is larger than the volume of the volatile memory device.

In another aspect of the present application, a method for reading and writing data, within a memory module is provided. The memory module includes one or more volatile memory devices and one or more non-volatile memory devices. The method includes the following operations: receive a command of reading data from the non-volatile memory devices and writing the data into the volatile memory devices from memory controller; read the data from the non-volatile memory devices; and write the data into the volatile memory devices.

In some embodiments, the data is not passed through the memory controller. In some embodiment, the data is passed within the memory module. In some embodiments, the data is not passed through the data interface.

In some embodiments, the memory module includes a buffer, and the method further includes the following operation: store the data read out from the non-volatile memory devices in the buffer; and write the data stored in the buffer into the volatile memory devices.

In another aspect of the present application, a method for reading and writing data within a memory module is provided. The memory module includes one or more volatile memory devices and one or more non-volatile memory devices. The method includes the following operations: receive a command of reading data from the volatile memory devices and writing the data into the non-volatile memory devices from memory controller: read the data from the volatile memory devices; and write the data into the non-volatile memory devices.

In some embodiments, the memory module includes a buffer, and the method further includes the following operation: store the data read out from the volatile memory devices in the buffer; and write the data stored in the buffer into the non-volatile memory devices.

In some embodiments, the data is not passed through the memory controller. In some embodiment, the data is passed within the memory module. In some embodiments, the data is not passed through the data interface.

In another aspect of the present application, a memory module is provided. The memory module includes one or more volatile memory devices and one or more non-volatile memory devices. The volatile memory devices and the non-volatile memory devices can exchange data within the memory module.

In another aspect of the present application, a memory module for using in a computing system is provided. The memory module includes one or more volatile memory device and one or more non-volatile memory devices. When the computing system is switched from running state to sleeping state, at least part of data stored in the volatile memory devices is read out and written into the non-volatile memory devices. When the computing system is recovered from sleeping state to running state, the data is read out from the non-volatile memory device and written into the volatile memory devices.

In another aspect of the present application, a method for exchanging data within a memory module is provided. The memory module includes one or more volatile memory devices and one or more non-volatile memory devices. The method includes the following operations: receive a command of reading data from the non-volatile memory devices and writing the data into the volatile memory devices; read the data from the non-volatile memory devices; and write the data into the volatile memory devices. The process of reading the data from the non-volatile memory devices and writing the data into the volatile memory devices is performed within the memory module.

In another aspect of the present application, a method for exchanging data within a memory module is provided. The memory module includes one or more volatile memory devices and one or more non-volatile memory devices. The method includes the following operations: receive a command of reading data from the volatile memory devices and writing the data into the non-volatile memory devices; read the data from the volatile memory devices; and write the data into the non-volatile memory devices. The process of reading the data from the volatile memory devices and writing the data into the non-volatile memory devices is performed within the memory module.

The designs of the present application can reduce the burden of CPU and memory controller, accelerate initiation and shut down of computing system and switch between running state and sleeping state of computing system, and reduce power consumption.

BRIEF DESCRIPTION OF THE DRAWINGS

The accompanying drawings are included to provide a further understanding of the present application and are incorporated in and constitute a part of this specification. The drawings illustrate the embodiments of the present application and together with the description serve to explain the principles of the application. Other embodiments of the present application and many of the intended advantages of the present application will be readily appreciated, as they become better understood by reference to the following detailed description. The elements of the drawings are not necessarily to scale relative to each other. Like reference numerals designate corresponding similar parts.

DETAILED DESCRIPTION OF ILLUSTRATED EMBODIMENTS

In the following detailed description, reference is made to various specific embodiments of the invention. These embodiments are described with sufficient detail to enable those skilled in the art to understand the application. It is to be understood that other embodiments may be employed, and that various structural, logical and electrical changes may be made without departing from the spirit or scope of the application. In describing the preferred embodiments, specific terminology will be resorted to for the sake of clarity. However, it is not intended that the application be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit element where such connection is needed.

Figure 1:
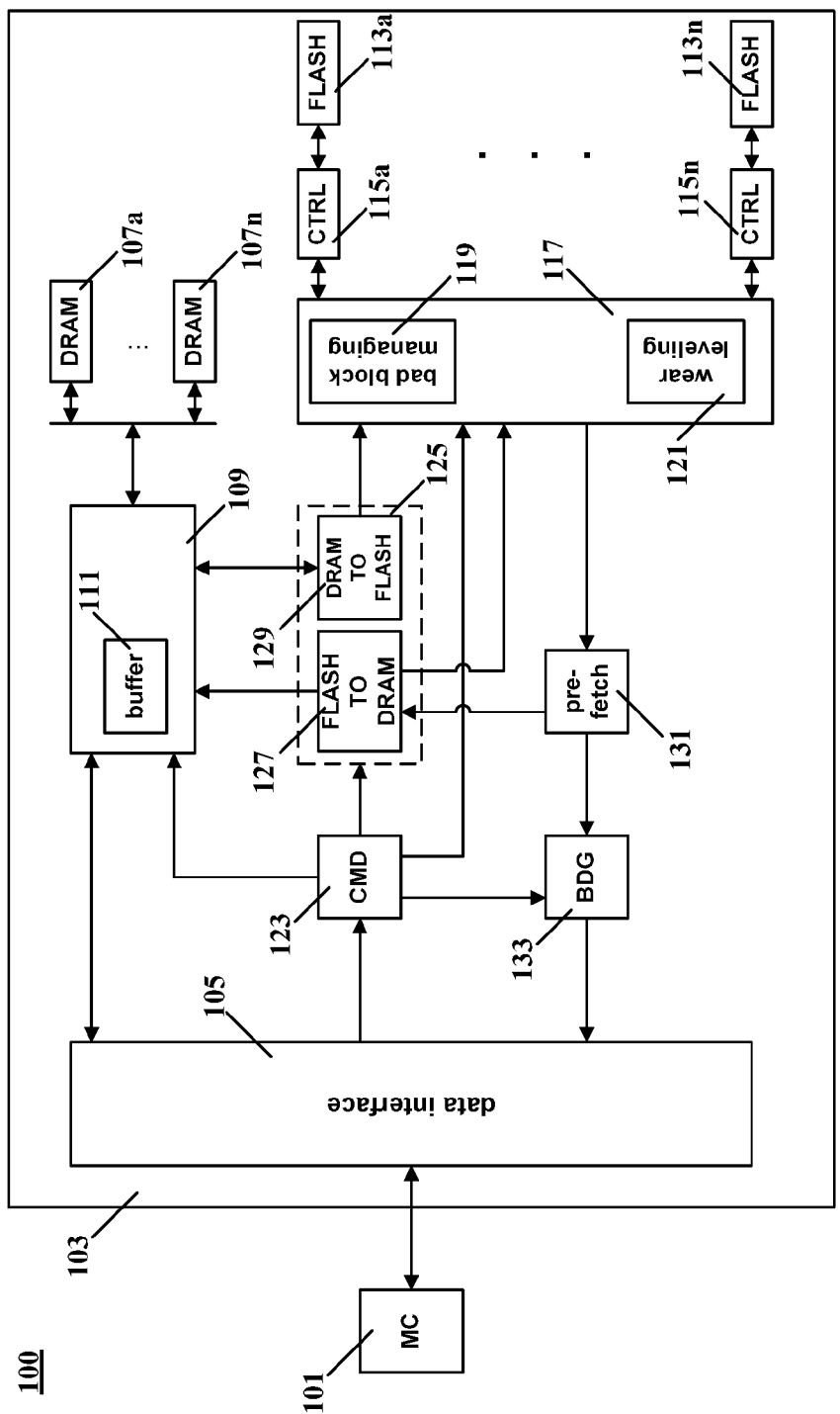
FIG. 1 illustrates an example block diagram of a memory system.

FIG. 1 illustrates a block diagram of a memory system 100 in one embodiment. The memory system 100 may be used to buffer data exchange between CPU (not shown) and other devices in a computing system such as personal computer, server, workstation, super computer etc. The memory system 100 includes a memory controller 101 and a memory module 103. For convenience, only one memory module is illustrated in the embodiment of FIG. 1, but it will be appreciated that any number of memory modules can be present in the memory system.

The memory controller 101 controls reading and writing operations on the memory module 103.

The memory module 103 includes a data interface 105 through which the memory module 103 exchanges data with other devices. In some embodiments, the data interface 105 is compatible with standard DDR DIMM interfaces such as DDR-1 DDR-2, and DDR-3 etc. In some embodiments, the data interface 105 is compatible with standard RAMBUS memory module interface.

The memory module 103 includes a plurality of DRAM devices 107a-107n and a DRAM controller 109. The DRAM controller 109 controls reading and writing operations of DRAM devices 107a-107n. In some embodiments, the DRAM controller 109 includes a buffer 111 for buffering data to be written into and/or read from DRAM devices 107a-107n.

The memory module 103 includes a plurality of FLASH memory devices 113a-113n and a plurality of FLASH memory controllers 115a-115n for controlling the FLASH memory devices 113a-113n correspondingly.

The memory module 103 includes a managing device 117 for managing access to the FLASH memory devices 113a-113n. The managing device 117 includes a bad block managing device 119 and a wear leveling device 121. The bad block managing device 119 manages bad blocks in the FLASH memory devices 113a-113n to prevent the bad blocks from being used. The wear leveling device 121 manages number of write accesses to the blocks of the FLASH memory devices 113a-113n. The wear leveling device 121 is configured to prevent excessively high number of accesses on some blocks as compared to others, leading to earlier failure.

The memory module 103 further includes a command distributing device 123 which receives commands sent by the memory controller 101 from the data interface 105 and passes the commands to corresponding devices in the memory module 103.

The memory module 103 further includes a data exchange controller 125 for controlling data exchange between the DRAM devices 107a-107n and the FLASH memory devices 113a-113n. The data exchange controller 125 includes a first, data exchange controller 127 for controlling reading data from the FLASH memory devices 113a-113n and writing the data into the DRAM devices 107a-107n, and a second data exchange controller 129 for controlling reading data from the DRAM devices 107a-107n and writing the data into the FLASH memory devices 113a-113n. In some embodiments, the data exchange controller 125 can be realized by state machine.

The memory module 103 further includes a pre-fetch buffer 131 and a bridge device 133. The pre-fetch buffer 131 buffers data read from the FLASH memory devices 113a-113n. In some embodiments, the width of the pre-fetch buffer 131 is larger than that of the FLASH memory devices 113a-113n, and the FLASH memory devices 113a-113n are coupled to the pre-fetch buffer 131 in parallel such that data can be written into the pre-fetch buffer 131 from the FLASH memory devices 113a-113n in parallel. This configuration may compensate for low reading speed of FLASH memory devices and enhance the general efficiency of the memory module 103. The bridge device 133 transforms data received from the pre-fetch buffer 131 into a format that the data interface 105 is compatible of and sends the transformed data to the data interface 105. In some embodiments, the pre-fetch buffer 131 and the bridge device 133 may be integrated together.

In some embodiments, the DRAM devices 107a-107n and the FLASH memory devices 113a-113n use the same unified address space.

The operation of the memory module 103 will be described in detail with reference to FIG. 1 and FIG. 2-7.

Figure 2:
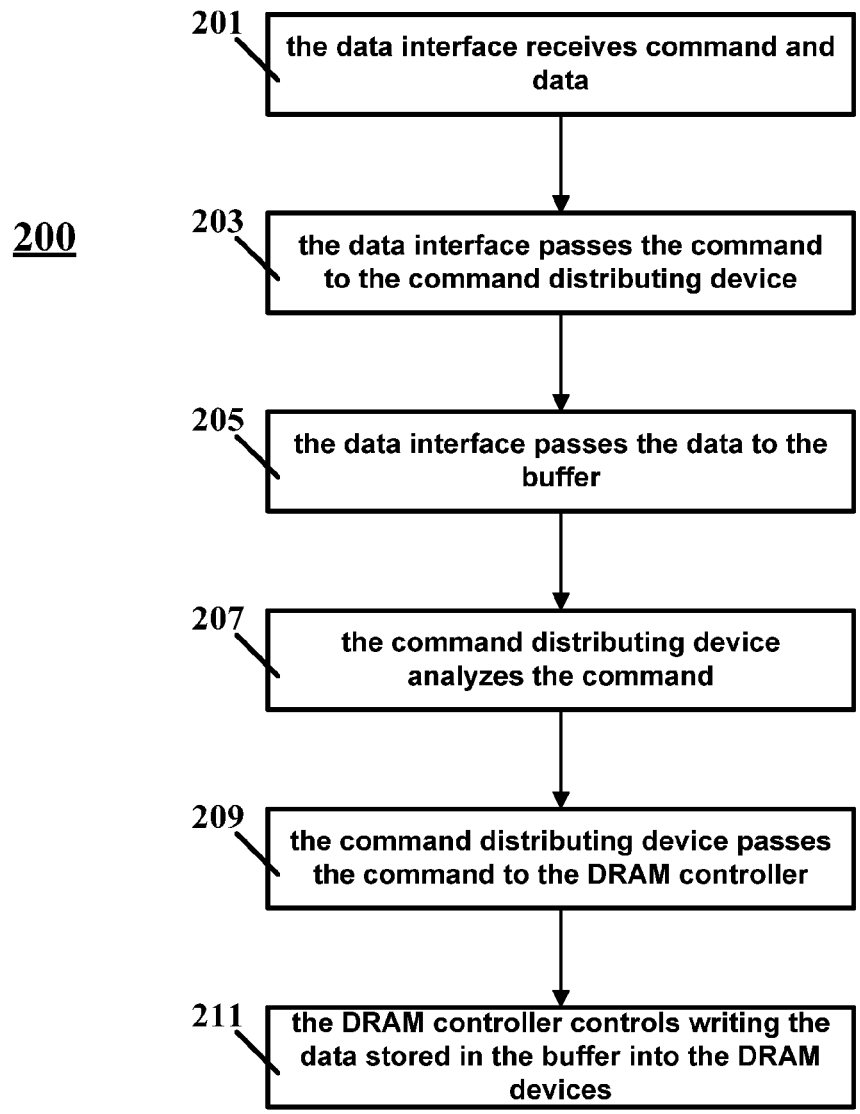
FIG. 2 illustrates an example flowchart of a method for writing data received from memory controller into volatile memory devices.

FIG. 2 illustrates a flowchart of a method 200 for writing data received from the data interface 105 into the DRAM devices 107a-107n. The method 200 includes the following operations: (201) the data interface 105 receives from the memory controller 101 a command of writing data into the DRAM devices 107a-107n and the data to be written into the DRAM devices 107a-107n; (203) the data interface 105 sends the command to the command distributing device 123; (205) the data interface 105 sends the data to the buffer 111; (207) the command distributing device 123 analyzes the received command; (209) the command distributing device 123 sends the command to the DRAM controller 109 based on the analysis; and (211) the DRAM controller 109 controls writing the data into the DRAM devices 107a-107n according to the received command.

In some embodiments, the command includes addresses on which the data to be written to.

In some embodiments, the command distributing device 123 generates new commands based on received commands. In some embodiments, the command distributing device 123 just passes received commands to corresponding devices in the memory module 103 based on analysis of the commands.

Figure 3:
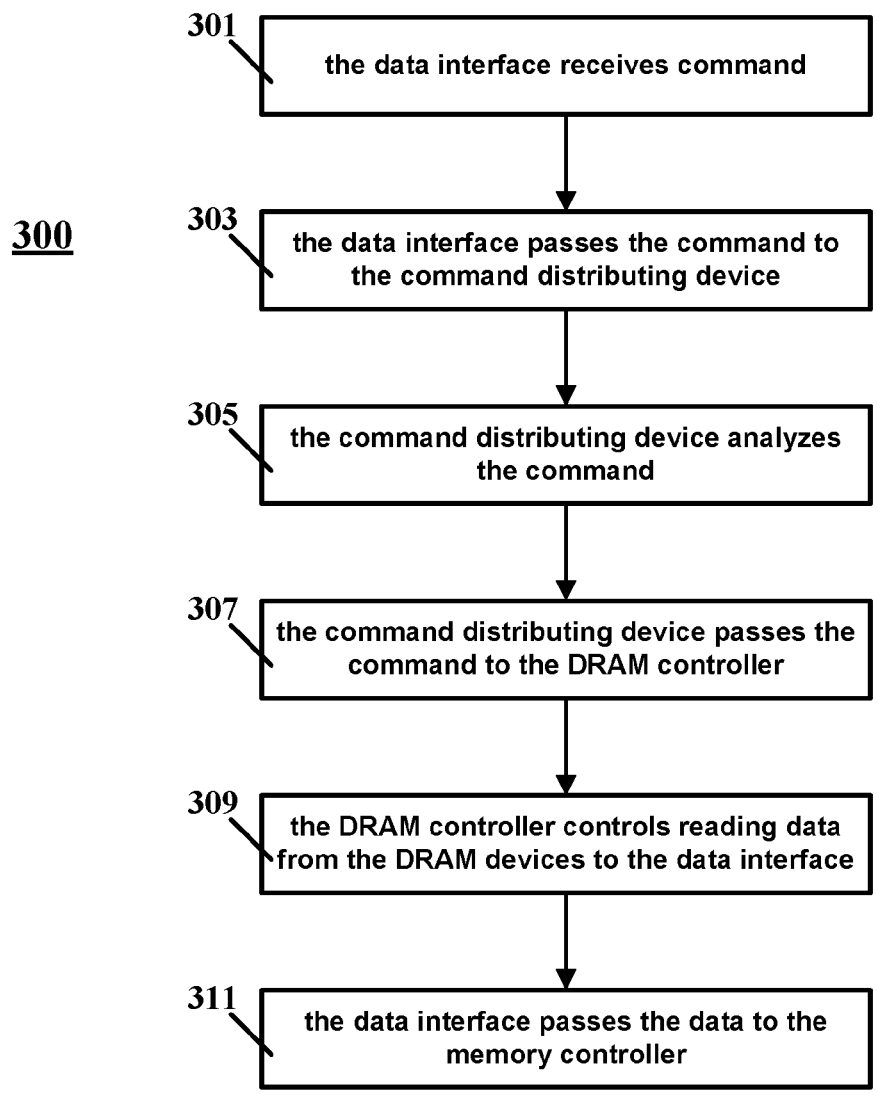
FIG. 3 illustrates an example flowchart of a method for reading data from volatile memory devices to memory controller.

FIG. 3 illustrates a flowchart of a method 300 for reading data from the DRAM devices 107a-107n to the data interface 105. The method 300 includes the following operations: (301) the data interface 105 receives from the memory controller 101 a command of reading data from the DRAM devices 107a-107n; (303) the data interface passes the command to the command distributing device 123; (305) the command distributing device 123 analyzes the received command; (307) the command distributing device 123 passes the command to the DRAM controller 109 according to the analysis of the command; (309) the DRAM controller 109 controls reading data from the DRAM devices 107a-107n to the data interface 105; and (311) the data interface 105 passes the data to the memory controller 101.

Figure 4:
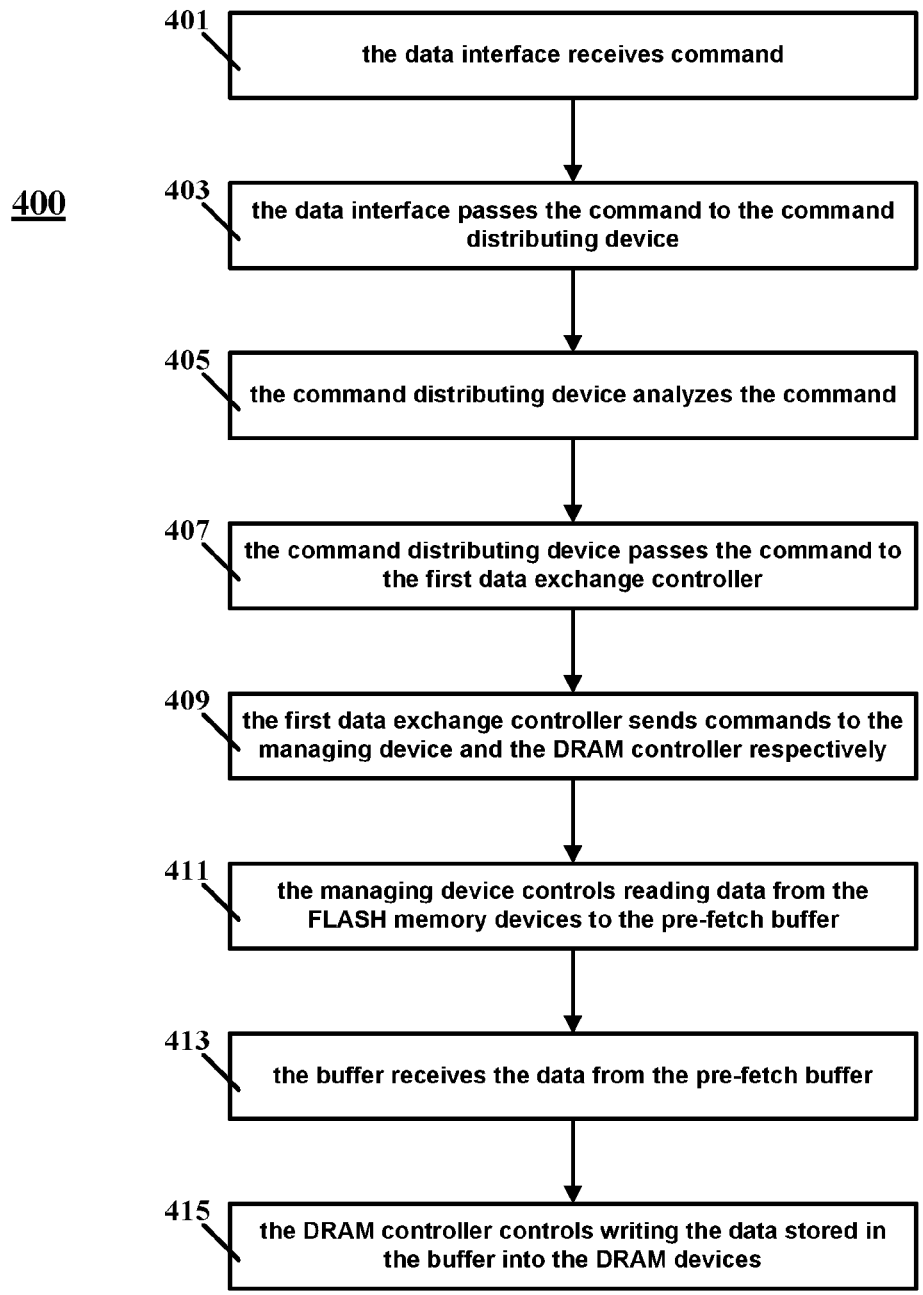
FIG. 4 illustrates an example flowchart of a method for reading data from non-volatile memory devices and writing the data into volatile memory devices.

FIG. 4 illustrates a flowchart of a method 400 for reading data from the FLASH memory devices 113a-113n and writing the data into the DRAM devices 107a-107n. The method 400 includes the following operations: (401) the data interface 105 receives from the memory controller 101 a command of reading data from the FLASH memory devices 113a-113n and writing the data into the DRAM devices 107a-107n; (403) the data interface passes the command to the command distributing device 123; (405) the command distributing device 123 analyzes the received command; (407) the command distributing device 123 passes the command to the first data exchange controller 127 according to analysis of the command; (409) the first data exchange controller 127 generates a command of reading the data from the FLASH memory devices 113a-113n and a command of writing the data into the DRAM devices 107a-107n, and sends the commands to the managing device 117 and the DRAM controller 109, respectively; (411) the managing device 117 controls reading the data from the FLASH memory devices 113a-113n to the pre-fetch buffer 131 according to the received command; (413) the buffer 111 receives the data from the pre-fetch buffer 131; and (415) the DRAM controller 109 controls writing the data in the buffer 111 into the DRAM devices 107a-107n.

Figure 5:
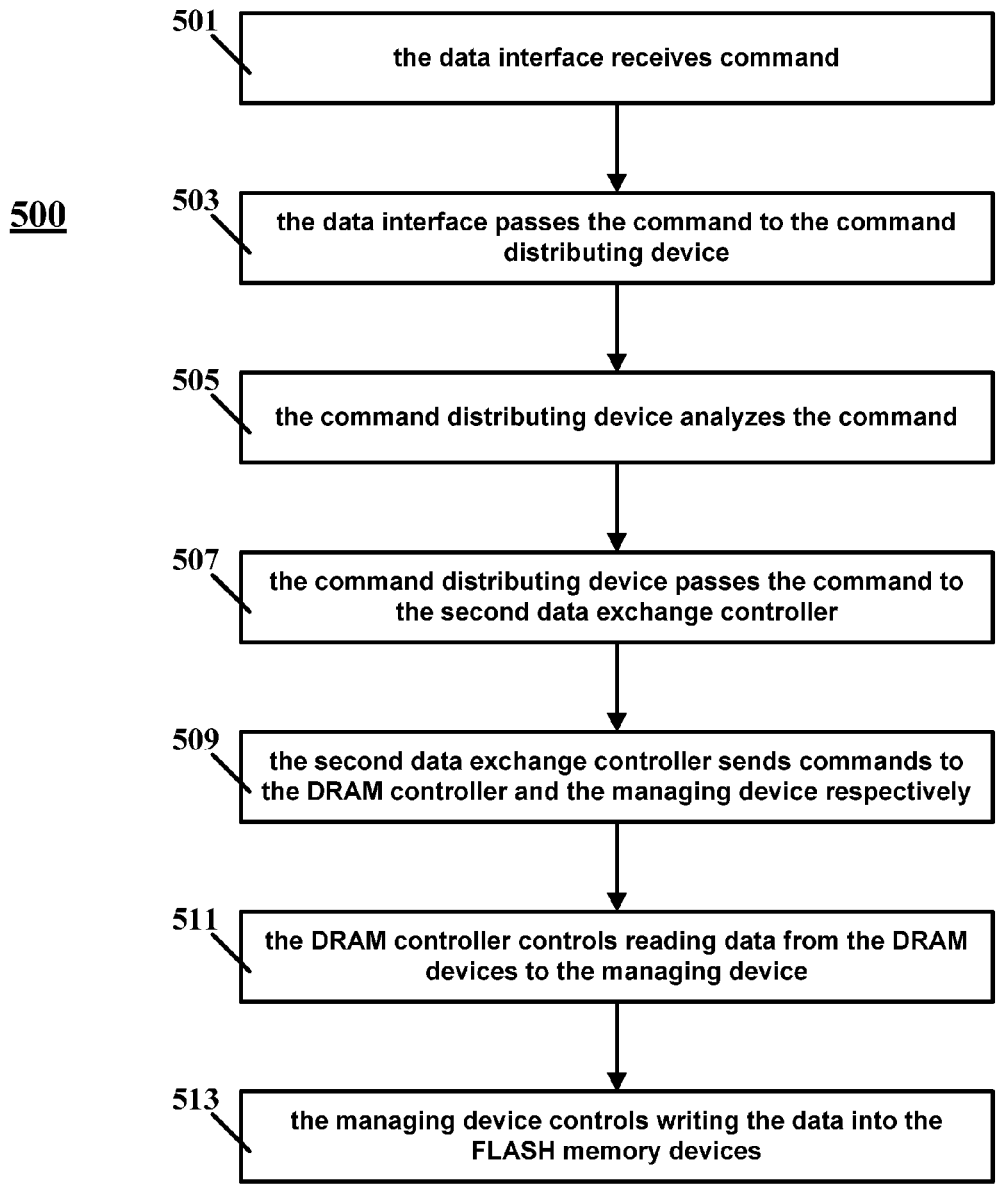
FIG. 5 illustrates an example flowchart of a method for reading data from volatile memory devices and writing the data into non-volatile memory devices.

FIG. 5 illustrates a flowchart of a method 500 for reading data from the DRAM devices 107a-107n and writing the data into the FLASH memory devices 113a-113n. The method 500 includes the following operations: (501) the data interface 105 receives from the memory controller 101 a command of reading data from the DRAM devices 107a-107n and writing the data into the FLASH memory devices 113a-113n; (503) the data interface 105 passes the command to the command distributing device 123; (505) the command distributing device 123 analyzes the received command; (507) the command distributing device 123 passes the command to the second data exchange controller 129 according to analysis of the command; (509) the second data exchange controller 129 generates a command of reading the data from the DRAM devices 107a-107n and a command of writing the data into the FLASH memory devices 113a-113n, and sends the commands to the DRAM controller 109 and the managing device 117, respectively; (511) the DRAM controller 109 controls reading the data from the DRAM devices 107a-107n to the managing device 117 through the second data exchange controller 129; and (513) the managing device 117 controls writing the received data into the FLASH memory devices 113a-113n.

Figure 6:
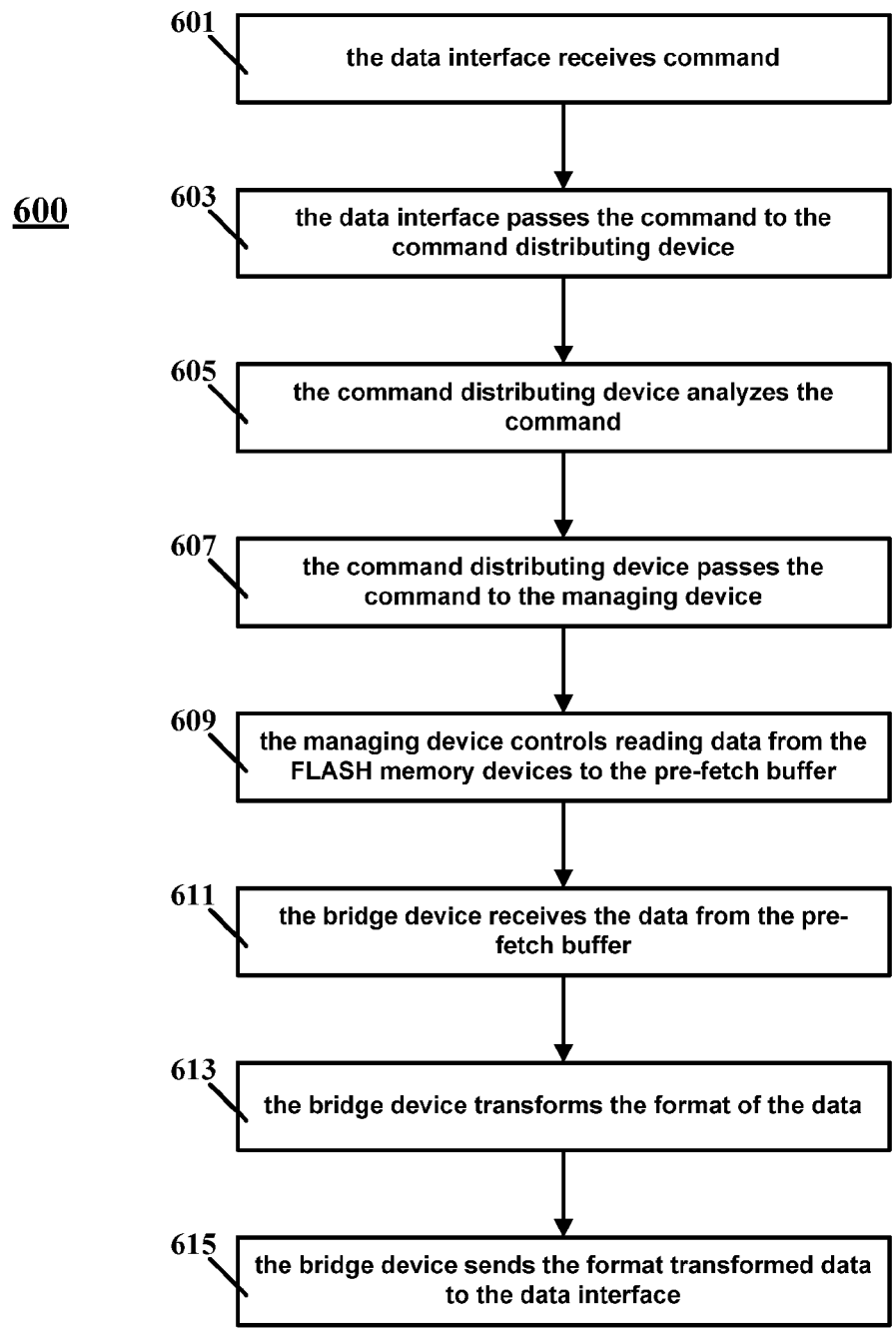
FIG. 6 illustrates an example flowchart of a method for reading data from non-volatile memory devices to memory controller.

FIG. 6 illustrates a flowchart of a method 600 for reading data from the FLASH memory devices 113a-113n to the data interface 105. The method 600 includes the following operations: (601) the data interface 105 receives from the memory controller 101 a command of reading data from the FLASH memory devices 113a-113n; (603) the data interface 105 passes the command to the command distributing device 123; (605) the command distributing device 123 analyzes the received command; (607) the command distributing device 123 passes the command to the managing device 117 according to the analysis of the command; (609) the managing device 109 controls reading the data from the FLASH memory devices 113a-113n to the pre-fetch buffer 131; (611) the bridge device 133 receives the data from the pre-fetch buffer 131; (613) the bridge device 133 transforms the received data into a format that the data interface 105 is compatible with: and (615) the bridge device 133 sends the transformed data to the data interface 105.

It will be appreciated that the methods described above are exemplary. The operations of the methods may be performed according to sequences other than those described above. Some operations may be combined, and some operation may be divided into a plurality of operations.

In some embodiments, the data exchange between the FLASH memory devices 113a-113n and the DRAM devices 107a-107n may bypass the data exchange controller 125.

Some devices such as the managing device 117, the command distributing device 123, the data exchange controller 125, and the bridge device 133 etc. described above may be realized by circuits, or computer programs, or combinations of circuits and computer programs.

In some embodiments, the memory module 103 includes a built in self-test device (MBIST) (not shown). Because a built in self-test device is capable of controlling reading and writing memory devices within a memory module, part of its circuits and/or function can be shared by the data exchange controller 125.

In some embodiments, the managing device 117 may be in abstraction layer.

In some embodiments, the FLASH memory devices 113a-113n may be used to store operating system of a computing system, user configuration related data and other computer programs such as computer programs that will be loaded automatically when the computing system is powered on, such computer programs include but not limited to anti-virus programs, electronic dictionaries, and any kind of driver programs.

In some embodiments, a plurality of memory modules of a memory system may perform internal data exchange simultaneously. If data that will be loaded automatically when the computing system is powered on is stored in FLASH memory devices of the plurality memory modules, at least part of the data will be loaded into DRAM devices within the memory modules without passing through a memory controller, However, in a conventional computing system, all data is stored in hard disks or other storage devices coupled to I/O interfaces of the computing system when the computing system is at powered off state. When the computing system is powered on, all data to be loaded into DRAM devices must go through a memory controller, and the speed of the memory controller becomes the bottle neck of the performance of the memory system.

In some embodiments, a block of the DRAM devices 107a-107n may be used as a buffer for buffering data received from the data interface 105 to be written into the FLASH memory devices 113a-113n.

Because CPU and memory controller do not participate in the internal data exchange within memory modules, CPU resources and memory controller resources are conserved and system performance can be enhanced.

In some embodiments, when in use, a memory module is inserted in a memory socket on a main board of a computing system and is controlled by a memory controller coupled to and controlled by a processor of the computing system.

In some embodiments, user may choose to load computer programs and related data from hard disks or from FLASH memory devices in memory modules.

We claim:

1. A memory module comprising:
   one or more volatile memory devices;
   one or more non-volatile memory devices;
   a data exchange controller for controlling data exchange between the one or more volatile memory devices and the one or more non-volatile memory devices within the memory module according to received instructions;
   a pre-fetch buffer for buffering data read from the one or more non-volatile memory devices, the one or more non-volatile memory devices are coupled to the pre-fetch buffer in parallel; wherein the width of the pre-fetch buffer is larger than that of the one or more non-volatile memory devices;
   a data interface for communicating data and command between the memory module and a memory controller for controlling data exchange between the memory module and other devices external to the memory module, and
   a bridge device for transforming data received from the pre-fetch buffer and originating from the one or more non-volatile memory devices to have a format compatible with the data interface and sending the transformed data to the data interface;
   wherein the one or more volatile memory devices and the one or more non-volatile memory devices within the memory module are coupled at a first side of the data interface, the other devices external to the memory module are coupled at a second side of the data interface opposite to the first side; and
   wherein the one or more volatile memory devices have a format compatible with the format of the data interface but different from the format of the one or more non-volatile memory devices;
   a first data path between the one or more volatile memory devices and the data interface, wherein the first data path comprises a buffer; and
   a second data path between the one or more non-volatile memory devices and the data interface, wherein the second data path comprises the pre-fetch buffer and the bridge device and wherein the first data path and the second data path do not comprise shared circuit elements.

2. A memory module of claim 1, wherein when the data exchange controller receives a first instruction, the data exchange controller controls reading data from the one or more non-volatile memory devices and writing the data into the one or more volatile memory devices.

3. A memory module of claim 1, wherein when the data exchange controller receives a second instruction, the data exchange controller controls reading data from the one or more volatile memory devices and writing the data into the one or more non-volatile memory devices.

4. A memory module of claim 1, wherein the memory module buffers data exchange between a CPU and other devices in a computing system.

5. A memory module of claim 1, wherein the one or more volatile memory devices are DRAM devices.

6. A memory module of claim 1, wherein the one or more non-volatile memory devices are FLASH memory devices.

7. A memory module of claim 1, the data interface being a double data rate interface.

8. A memory module of claim 7, wherein the memory module is a double data rate dual in line memory module.

9. A memory module of claim 1 further comprising a managing device for managing bad blocks in the one or more non-volatile memory devices and managing access times of blocks in the one or more non-volatile memory devices.

10. A memory module of claim 1, wherein the one or more volatile memory devices and the one or more non-volatile memory devices are addressed in a unified address space.

11. A memory module of claim 1 further comprising a command distributing device for analyzing commands received by the memory module and passing the received commands to corresponding devices in the memory module according to the analysis of the received commands.

12. A memory module of claim 11, wherein:
   when the command distributing device receives a command for reading data from the one or more volatile memory devices to the data interface of the memory module, or a command of writing data received from the data interface into the one or more volatile memory devices, the command distributing device passes the received command to the one or more volatile memory devices;
   when the command distributing device receives a command for reading data from the one or more non-volatile memory devices to the data interface, the command distributing device passes the received command to the one or more non-volatile memory devices; and
   when the command distributing device receives a command for reading data from the one or more non-volatile memory devices and writing the data into the one or more volatile memory devices, or a command for reading data from the one or more volatile memory devices and writing the data into the one or more non-volatile memory devices, the command distributing device passes the received command to the data exchange controller.

13. A memory module of claim 1, wherein the total volume of the one or more non-volatile memory devices is larger than the total volume of the one or more volatile memory devices.

14. A memory system for buffering data exchange between a CPU and other devices comprising a memory controller and the memory module of any of claims 1-10 or 12-13.

* * * * *